United States Patent [19]

Campbell

[11] Patent Number: 4,960,579

[45] Date of Patent: Oct. 2, 1990

[54] MEMBRANE PROCESS AND SYSTEM FOR NITROGEN PRODUCTION

[75] Inventor: Michael J. Campbell, Clarence Center, N.Y.

[73] Assignee: Union Carbide Corporation, Danbury, Conn.

[21] Appl. No.: 176,658

[22] Filed: Apr. 1, 1988

[51] Int. Cl.$^5$ .......................... B01J 8/02; C01B 21/00
[52] U.S. Cl. .................................... 423/351; 422/211; 422/236
[58] Field of Search ................. 423/351; 422/211, 236

[56] References Cited

U.S. PATENT DOCUMENTS

| | | | |
|---|---|---|---|
| 1,166,294 | 12/1915 | Winne | 423/351 |
| 1,272,181 | 7/1918 | Andreucci | 423/351 |
| 2,582,885 | 1/1952 | Rosenblatt | 423/351 |
| 2,826,480 | 3/1958 | Webster | 423/351 |
| 3,215,503 | 11/1965 | Nessler | 423/351 |
| 3,240,554 | 3/1966 | Angerhofer | 423/351 |
| 3,339,341 | 9/1967 | Maxwell et al. | 55/16 |
| 4,238,204 | 12/1980 | Perry | 55/16 |
| 4,367,135 | 1/1983 | Posey Jr. | 208/108 |
| 4,595,405 | 6/1986 | Agrawal et al. | 62/18 |
| 4,645,516 | 2/1987 | Doshi | 55/16 |
| 4,654,047 | 3/1987 | Hopkins et al. | 62/23 |
| 4,654,063 | 3/1987 | Auvil et al. | 62/18 |
| 4,701,187 | 10/1987 | Choe et al. | 55/16 |
| 4,781,907 | 11/1988 | McNeill | 423/351 |
| 4,814,156 | 3/1989 | Pinto | 423/351 |

FOREIGN PATENT DOCUMENTS

| | | | |
|---|---|---|---|
| 529368 | 8/1956 | Canada | 423/351 |
| 1241 | 1/1965 | Japan | 423/351 |
| 116396 | 9/1979 | Japan | 423/351 |

OTHER PUBLICATIONS

"Membranes set to tackle larger separation tasks", Chemical Engr. Sep. 28, 1987, pp. 14, 15 and 17.
"Inert Gas Generation for Offshore Platforms", American Institute of Chemical Engineers, 1986 Spring Meeting, Apr. 1986, N. Orleans.

Primary Examiner—John Doll
Assistant Examiner—Wayne A. Langel
Attorney, Agent, or Firm—Alvin H. Fritschler

[57] ABSTRACT

On-site membrane systems are used for air separation to produce a low purity nitrogen stream and for purifying impure hydrogen, the nitrogen and hydrogen being passed to a catalytic combustion system in which the oxygen content of the nitrogen stream is reacted with said hydrogen to reduce the residual oxygen content of the nitrogen in a final purification operation to produce high purity nitrogen. Pressure swing adsorption systems can be employed in place of the membrane systems for particular applications, and a cryogenic system can be employed for said hydrogen purification.

22 Claims, 1 Drawing Sheet

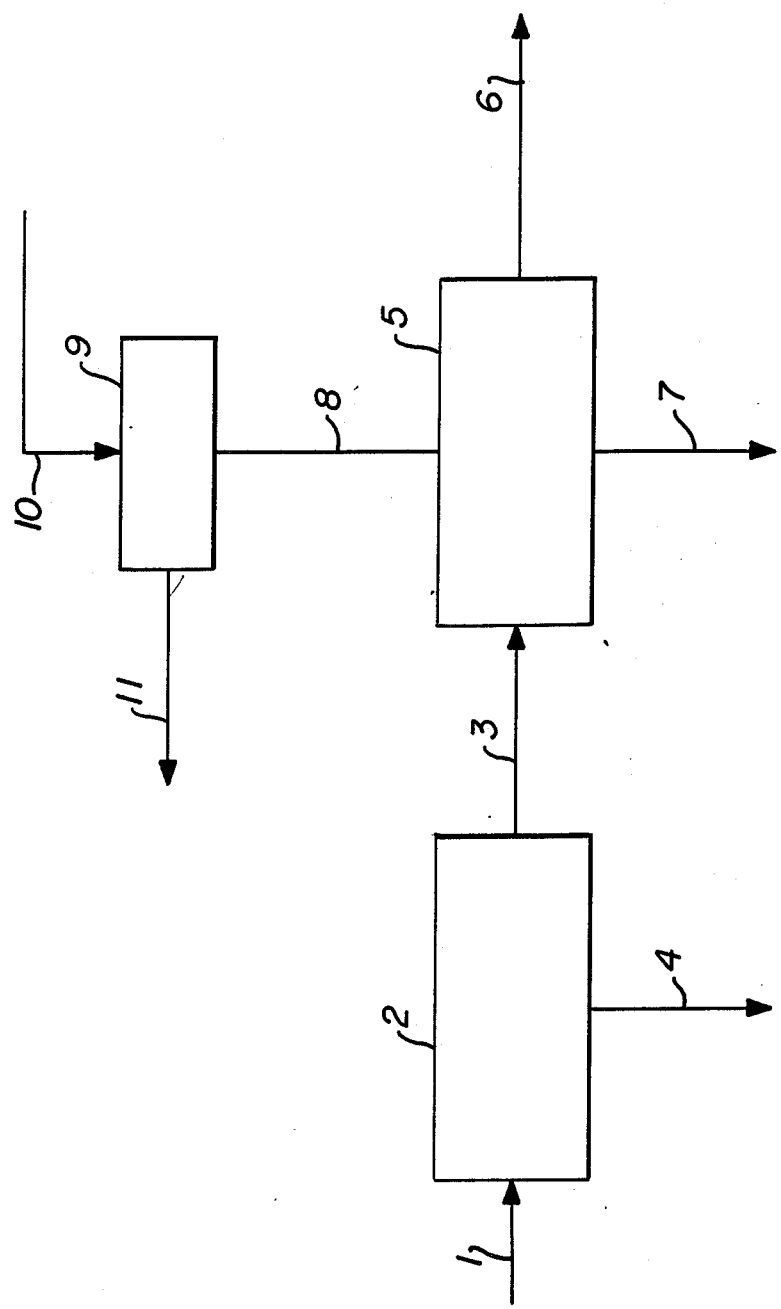

MEMBRANE PROCESS AND SYSTEM FOR NITROGEN PRODUCTION

BACKGROUND OF THE INVENTION

1. Field of the Invention

The invention relates to the production of nitrogen. More particularly, it relates to a membrane process and system for the production of low cost, high purity nitrogen.

2. Description of the Prior Art

The production of high purity nitrogen has, for many years, been carried out employing state of-the-art air separation technology based on cryogenic distillation techniques. Because of the favorable economics of scale up for such cryogenic distillation, large tonnage nitrogen users are supplied with nitrogen gas piped from a cryogenic plant installed on the users' site. Smaller tonnage users, i.e., 2-30 tons/day or less, are typically supplied with liquid nitrogen trucked to the users' site from a centrally located liquid nitrogen production plant. The cost of liquefying nitrogen gas and of transporting the liquid nitrogen from an off-site cryogenic plant to the users' site will be seen to add significantly to the cost of the nitrogen as supplied to the user.

In recent years, therefore, a major challenge in the art has been to develop small tonnage air separation plants that can effectively produce low cost nitrogen gas at the users' site. Recent developments relating to pressure swing adsorption (PSA) and membrane technologies have served to significantly lower the cost of on site systems for the production of low purity, small tonnage nitrogen. On the other hand, high purity nitrogen cannot be economically produced by such PSA or membrane systems because of practical limitations rendering the power requirements and the cost of such systems prohibitive.

There is a desire in the art for the development of membrane or PSA systems and approaches capable of reducing the cost of on-site, high purity nitrogen. One approach that has been employed to reduce the cost of said on-site, high purity nitrogen involves the use of a membrane or PSA system coupled with a trace oxygen removal system for final purification of the nitrogen product. In this approach, a membrane or PSA system is used for initial air separation to produce nitrogen at up to 3,000 ppm of oxygen, or higher, with a catalyst system then being used to remove additional oxygen to produce a purified nitrogen product stream having a residual oxygen content of 10 ppm or less. While this approach enables high purity nitrogen to be produced on site at a lower cost than by membrane or PSA systems alone, the cost saving achieved thereby nevertheless represents only a marginal improvement over that associated with the supply of liquid nitrogen by truck to the users' site. This is primarily due to the relatively high cost of the hydrogen required to react with the oxygen present in the partially purified nitrogen stream for a removal thereof. This approach could be of more practical commercial significance as compared to the trucking of liquid nitrogen, however, if a low cost hydrogen supply source were available at the users' site.

There are presently a number of industrial applications, particularly in the petrochemical industry, which require high purity nitrogen and that also have low cost hydrogen available on site. Frequently, however, this low cost, available hydrogen is impure and contains various hydrocarbons. The use of such impure hydrogen would be disadvantageous with respect to the operation of a catalyst system for final nitrogen purification. If such impure hydrogen could be purified at relatively low cost, however, the resulting high purity hydrogen could then be used in an efficient and effective manner in said catalyst system for final, on-site nitrogen purification.

The inherent simplicity of permeable membrane systems provides a strong incentive and desire in the art for the development of such systems and related processes for the on-site production of high purity nitrogen. Those skilled in the art will also appreciate that there are particular overall processing operations for which an on site PSA system is more appropriate than a membrane system, despite the inherent simplicity of membrane systems. The desire in the art for improved overall membrane and PSA systems for on-site, high purity nitrogen production will thus be seen as involving, in approaches utilizing a catalyst system for final nitrogen production, the development of means to effectively utilize the low-cost, impure hydrogen frequently available at the users' site in the production of high purity nitrogen in a commercially feasible and efficient manner.

It is an object of the invention, therefore, to provide an improved system and process for the production of on-site, high purity nitrogen.

It is another object of the invention to provide an improved overall system and process utilizing membrane or PSA systems for such on-site, high purity nitrogen production.

It is a further object of the invention to provide an overall system and process for the production of on site, high purity nitrogen by the utilization of membrane or PSA systems and of available low cost, impure hydrogen available on site.

With these and other objects in mind, the invention is hereinafter described in detail, the novel features thereof being particularly pointed out in the appended claims.

SUMMARY OF THE INVENTION

Partially purified nitrogen recovered from an on site membrane or PSA system is passed to a catalyst or combustion system for final purification by reaction of the oxygen content thereof with a purified hydrogen stream. A separate membrane or PSA system is used to recover such a purified hydrogen stream from low cost, impure hydrogen available at the users' site. The use of three separate systems and processes in such an integrated manner enables the cost of producing high purity nitrogen to be significantly reduced, and the feasibility of producing on-site, high purity nitrogen to be appreciably enhanced.

BRIEF DESCRIPTION OF THE INVENTION

The invention is hereinafter further described in detail with reference to the accompanying single figure schematic diagram of an embodiment of the advantageous three component system of the invention.

DETAILED DESCRIPTION OF THE INVENTION

The objects of the invention are accomplished by the use of three systems and processing operations, in a unique combination, to produce high purity nitrogen. Such systems and processing enable the well recognized and desired advantages of membrane or PSA technologies to be utilized, as appropriate, while also effectively employing sources of low cost, impure hydrogen available at the users' site, in the high purity nitrogen production operation.

The membrane, PSA and catalytic combustion systems and processes employed in the practice of the invention will be understood to constitute, individually, well known, commercially available technologies. By the unique combination of these technologies as herein disclosed and claimed, a low cost, impure hydrogen stream available at users' site can be used to facilitate the convenient on-site production of high purity nitrogen as desired in the art as a practical commercial alternative to the use of liquid nitrogen trucked to a users' site from a centrally located liquid nitrogen plant for relatively smaller tonnage use at said site. It will be appreciated that the membrane systems referred to herein can be used for both the initial air separation operation to produce a low cost, low purity nitrogen stream and for the purification of the low cost, impure hydrogen stream available at users' site for subsequent use in the final nitrogen purification operation. Alternatively, PSA systems can be used for both of these operations. It is also within the scope of the invention to employ a membrane system for one of the operations and a PSA system for the other, depending on the technical and economic requirements of a given application and of the overall capabilities of the available membrane and PSA systems with respect to such requirements. A catalyst system with hydrogen addition will also be employed in various embodiments of the invention for final nitrogen purification. While the particular system and process employed in any particular high purity nitrogen production operation will depend upon the conditions and requirements of said operation, it is generally preferred to employ a membrane system for initial air separation, in combination with a catalytic combustion unit for final nitrogen purification with hydrogen that has been purified in a membrane system.

Those skilled in the art will appreciate that membrane systems are capable of selectively permeating a more readily permeable component of a feed gas mixture containing said component and a less readily adsorbable component. Any desired type of membrane, such as composite membranes, asymmetric membranes or any other form of membrane configuration, can be employed in the practice of the invention. Such membranes suitable for the air separation purposes of the invention generally comprise separation materials capable of selectively permeating oxygen as the more readily permeable component of air, with nitrogen as the less readily permeable component being recovered as a nitrogenrich non-permeate gas. It is also within the scope of the invention, however, to employ a membrane system for initial nitrogen separation from air in which nitrogen is the more readily permeable component, an oxygen rich gas stream is removed, and a nitrogen rich gas stream is recovered as the permeate gas. In the membrane system used in various embodiments of the invention for purifying impure sources of hydrogen available at the users' site, the purified hydrogen will commonly be recovered as permeate gas. Membrane systems capable of recovering hydrogen as a purified non permeate gas stream could also be employed if such systems were capable of achieving the desirable level of purification of impure hydrogen streams for purposes of the invention.

As noted above, PSA systems may be desirable for use in the air separation and/or in the purification of impure hydrogen steps of the invention, depending upon the particular requirements and operating conditions pertaining to a given high purity nitrogen production application. Those skilled in the art will appreciate that such PSA systems contain one or more beds of adsorbent material capable of selectively adsorbing a more readily adsorbable component of a feed gas mixture containing said component and a less readily adsorbable component. It will be understood that such PSA systems employ various processing cycles in which each bed, in sequence, generally undergoes an adsorption desorption cycle in which the less readily adsorbable component is withdrawn from the bed during introduction of the feed gas mixture to the bed at upper adsorption pressure levels and in which the more readily adsorbable component is withdrawn from the bed during bed regeneration at lower desorption pressure. While PSA systems employed for air separation to recover nitrogen as the desired product generally employ adsorbent beds capable of selectively adsorbing oxygen as the more readily adsorbable component of air, it is also within the scope of the invention to employ PSA systems in which nitrogen is selectively adsorbed as the more readily adsorbable component. While PSA systems are known to generally involve a number of individual steps in the processing cycle carried out in each bed, the details of the PSA processing cycle employed in particular embodiments, e.g. pressure equalization, purge and repressurization steps, do not reach to the heart of the invention and need not be described in detail herein.

The catalytic combustion system and process employed in the practice of the embodiments of the invention, commonly known in the art as "deoxo" units, likewise comprises well known, established technology for further reducing the oxygen level of the partially purified nitrogen stream obtained by air separation in a membrane or PSA system. The deoxo unit typically employs a noble metal catalyst, such as a platinum or a platinum-palladium catalyst supported on an alumina substrate. The catalytic combustion system can comprise one or more catalytic beds in which the oxygen content of the partially purified nitrogen stream produced by air separation in a suitable membrane or PSA system is reacted with hydrogen or a fuel gas such as methane, that has been purified as herein provided, from a low cost, impure stream available at a petroleum refinery or other appropriate users site. The catalytic combustion nitrogen purification operation can thus be carried out in one or more catalytic stages employing a suitable, commercially available catalyst, capable of facilitating the removal of oxygen from the nitrogen stream being purified, down to a desired low level of residual oxygen content. It will be understood by those skilled in the art that such catalytic combustion systems are generally needed when purified hydrogen is employed as a reactant.

From the above, it will be understood that various commercially available purification systems readily available in the art, and related processing features, can be employed for the three separate purification systems and processes advantageously combined as herein described and claimed for the production of high purity nitrogen. In general, however, the preferred embodiment of the invention comprises the use of a membrane system for initial air separation purposes, together with a deoxo catalyst unit for final nitrogen purification, said deoxo unit being supplied with hydrogen for reaction with oxygen present in the partially purified nitrogen stream obtained from said air separation, the reactant hydrogen also having been purified in a membrane system.

In the preferred embodiments in which membranes are employed for the initial air separation operation, the oxygen content of the partially purified nitrogen stream will typically range from a lower level of about 1,000 ppm up to about 50,000 ppm, typically 10,000–30,000 ppm. The high purity nitrogen stream produced in the practice of the invention will typically have a residual oxygen content of less than about 5,000 ppm, with said residual oxygen content being less than about 1,000 ppm in particular embodiments of the invention. The purified hydrogen reactant employed in the final purification operation, and the impure reactant from which said purified reactant is derived, can vary in initial and final purity levels depending on the requirements of a given application. Reactant hydrogen will typically be purified to about $95^+\%$ hydrogen from any lower purity stream generally available at the users' site. The actual hydrogen purity limits employed in a particular application will generally vary depending on the users' final nitrogen product purity requirements. Those skilled in the art will appreciate that the invention can be advantageously employed with respect to high purity nitrogen production units of any size depending upon the various technical and economic factors pertaining to a given application, but that the invention will be particularly attractive, from an economic view point, for high purity nitrogen production units in the 5,000–50,000 cubic feet per hour range. The invention will be understood to be particularly valuable in refinery or other petrochemical facilities in which a ready source of low cost hydrogen is readily available and can be advantageously employed as a reactant in the final purification operation for the production of high purity nitrogen at an economically attractive cost. The practice of the convenient reactant purification operation, as herein described and claimed, enables such desired use of available low cost, impure hydrogen to be accomplished in a practical, commercially feasible manner.

With reference to the drawing, feed air will be seen as passing through line 1 to a membrane or PSA on-site system 2 in which nitrogen is separated from oxygen and is recovered in line 3 as a partially purified nitrogen stream. An oxygen rich stream separated from said nitrogen, e.g. as the permeate stream of a typical membrane system, is discharged through line 4 as a waste stream of the subject nitrogen production process, said waste stream being discarded or used for some other desired purpose. The partially purified nitrogen stream passes from line 3 into a suitable catalytic combustion system 5 from which high purity nitrogen product is received in line 6. Waste water formed upon reaction of the reactant hydrogen or methane with oxygen present in the partially purified nitrogen stream can be removed, if desired, through line 7. Said hydrogen reactant is passed to catalyst or combustion system 5 through line 8 from membrane or PSA separation system 9 which is used to purify low cost, impure hydrogen or methane available at the users' facility and passed to said separation system 9 through line 10. Waste gas from said separation system 9, i.e. typically non permeate gas, is passed from the system through line 11 for discharge or use in a desired manner. It should be noted that separation system 9 can also comprise a cryogenic hydrogen purification or upgrading unit.

The generally preferred use of a membrane system for initial air separation is based on the inherent simplicity of membrane systems as compared to the necessary valving and compressor use necessarily associated with PSA systems. While membranes are highly desirable for gas separations to produce relatively low purity products, e.g. nitrogen with 1% or greater oxygen content, the production of high purity products by the membrane system approach generally requires a high power consumption, and a relatively large amount of available membrane surface, which tend to make membrane systems alone uneconomic for such high purity applications.

For applications requiring higher purity products, e.g. lower oxygen impurity levels, the combining of a membrane system with a catalytic combustion system, not heretofore feasible from a practical view point, has been rendered desirable and advantageous when carried out in accordance with the invention. As noted above, nitrogen with a $1^+\%$ oxygen content from a membrane system for air separation can be passed to a catalyst system to which high purity hydrogen is added as a reactant that reacts with the oxygen present in the nitrogen stream to form water. The water, if required, is conveniently removed from the purified nitrogen stream.

Any impurities present in the hydrogen reactant stream, if not reacted in the catalyst system, will, of course, end up in the final nitrogen product stream. If the hydrogen reactant stream contains such impurities, in relatively large amounts, such impurities can have an adverse effect on the catalyst system, as well as resulting in the presence of an unacceptable level of impurities in the nitrogen product. It is for such reasons that it is desirable to use relatively high purity hydrogen, i.e. $95^+\%$, in the catalyst system.

It will be appreciated that the high purity hydrogen supply represents a significant cost factor in the overall cost of high purity nitrogen production. The catalyst system and the hydrogen supply typically add about 50% to the cost of low purity nitrogen for the production of such high purity nitrogen product. Typically, 60–70% of this 50% increase is associated with the cost of high purity hydrogen reactant. In various refineries and other industrial facilities, impure hydrogen is available at very low cost. If this low cost, impure hydrogen is used, in accordance with the practice of the invention, as the reactant for the catalyst system, a significant reduction in the overall cost of high purity nitrogen can be realized.

In one embodiment of the invention, air is initially separated in an on site membrane system to produce a partially purified nitrogen stream having about 30,000 ppm oxygen. This relatively low purity nitrogen stream is passed to a deoxo catalyst system for reduction of the oxygen content thereof to less than 10 ppm by reaction with purified hydrogen therein. The purified hydrogen is obtained from a source of 77% purity hydrogen available at the users' site, said impure hydrogen being purified to 98% in a membrane system before being injected into the catalyst unit, the overall combination of systems being as illustrated in the drawing. By the production of high purity nitrogen in this manner, using available low cost, impure hydrogen for the final nitrogen purification reaction, the incremental cost of producing high purity nitrogen over the initial cost of producing low purity nitrogen is reduced from about a 50% increase when high cost, high purity hydrogen is employed in the final purification step to about a 20% increase when low purity hydrogen available at the users' site is purified conveniently and economically in a membrane system in the practice of the invention. As a result of this advantageous benefit of producing high purity nitrogen in accordance with the practice of the invention, the overall cost of producing high purity nitrogen can be reduced by about 25%. This appreciable reduction in cost enables relatively small tonnage air separation plants to be commercially feasible and an attractive alternative to the transportation of liquid nitrogen from a liquid nitrogen plant at an off site regional location to the users' site.

Those skilled in the art will appreciate that various changes and modifications can be made in the details of the invention without departing from the scope of the invention as set forth in the appended claims. Thus, the permeable membranes employed in the practice of the invention will commonly be employed in membrane assemblies typically positioned within enclosures to form a membrane module comprising the principal element of a membrane system. As understood with reference to the invention, a membrane system comprises a membrane module or a number of such modules, arranged for either parallel or series operation. The membrane modules can be constructed in convenient hollow fiber form, or in spiral wound, pleated flat sheet membrane assemblies, or in any other desired configuration. Membrane modules are contracted to have a feed air surface side and an opposite permeate gas exit side. For hollow fiber membranes, the feed air can be added either to the bore side or to the other surface side of the hollow fibers.

It will also be appreciated that the membrane material employed for the air separation membrane and for the hydrogen purification membrane can be any suitable material capable of selectively permeating a more readily permeable component of the feed gas, i.e. air or impure hydrogen. Cellulose derivatives, such as cellulose acetate, cellulose acetate butyrate and the like; polyamides and polyimides, including aryl polyamides and aryl polyimides; polysulfones; polystyrenes and the like, are representative of such materials. Composite membranes, such as ethyl cellulose on a polysulfone substrate, are convenient for many air separation and other applications as the material of the separation layer, which determines the separation characteristics of the composite, can be tailored to the particular performance requirements and operating conditions of a given application.

The PSA systems employed in the practice of the invention will typically comprise a number of adsorbent beds operated in accordance with processing cycles adapted to the number of beds actually employed, the applicable operating conditions and the desired performance requirements of a given application. The adsorbent material employed in each bed can be any suitable adsorbent material capable of selectively adsorbing a more readily adsorbable component of the feed air or impure hydrogen, while enabling the less readily adsorbable component of said feed gas to be withdrawn from the bed. Zeolite molecular sieve materials, such as 5A and 13X material, are convenient adsorbent bed materials for the selective adsorption of impurities from an impure hydrogen stream and for the selective adsorption of nitrogen from feed air. Carbon molecular sieves, on the other hand, function in accordance with a different adsorption mechanism and, when used in air separation applications, result in the selective adsorption of oxygen as the more readily adsorbable component, with nitrogen being recovered as the less readily adsorbable component of feed air.

Those skilled in the art will appreciate that any well known, commercially available deoxo catalyst can be used in the final nitrogen purification operation. As with membrane and PSA systems, one or more catalyst stages can be employed in achieving the desired reaction of oxygen present in the nitrogen stream being purified with hydrogen. As the reaction is exothermic in nature, suitable heat exchange means may be conveniently employed for efficient heat utilization in the reaction operation which generally occurs at a reaction temperature on the order of about 500° C.

The invention has been described herein with respect to on site facilities. For purposes of the invention, such on site facilities are typically deemed to denote the unique combination of separation and reaction systems as herein disclosed and claimed located at a convenient location on users' site where high purity nitrogen is desired. The users' site should not be construed, however, as narrowly defining the property limits of a particular users' site. To the contrary, it is within the scope of the invention to position said on-site membrane, PSA or reaction systems over-the-fence or at some other convenient location in proximity to, but not on, the premises referred to in another context as the users' site. Any such convenient location is deemed to constitute on-site operation for purposes of the invention, as contrasted to a geographically regional liquid nitrogen plant that may be located at a convenient location for the region but many miles from the users' site, which is supplied with liquid nitrogen by truck from said regional location.

In light of the increasing need at refineries and other industrial locations for high purity nitrogen, as for blanketing, inerting or purging operations in which a low oxygen content is necessary or desirable for safety or product quality purposes, the invention provides a highly desirable process and system for satisfying such needs by convenient on-site capability at an economically feasible cost. The invention thus provides a significant advance in the art, one that further enlarges the ever-growing scope of application for the convenient and highly convenient and highly practical membrane technology and also, in particular applications, for the use of pressure swing adsorption technology in satisfying an important commercial need. The flexibility of the invention in satisfying the requirements of a given application by the convenient application of membrane systems, PSA systems, or a combination thereof, further enhances the importance of the invention is satisfying an important commercial need in a highly desirable manner tailored to the particular requirements of each specific application.

I claim:

1. An on-site system for the production of high purity nitrogen gas from air comprising:
   (a) a first membrane or pressure swing adsorption separation system capable of separating air into a partially purified nitrogen stream containing residual oxygen and an oxygen rich discharge stream;
   (b) means for supplying feed air to said first membrane or pressure swing adsorption separation system for separation therein;
   (c) a second membrane, pressure swing adsorption or cryogenic separation system capable of separating relatively pure hydrogen from an impure hydrogen stream containing a relatively high level of impurities, so as to produce a purified hydrogen stream having a desirably low level of said impurities;

(d) means for supplying impure hydrogen feed gas available on-site to said second membrane, pressure swing adsorption or cryogenic separation system for purification therein;

(e) a catalytic combustion system adapted for the reaction of said purified hydrogen stream with residual oxygen present in the partially purified nitrogen stream;

(f) means for passing the partially purified nitrogen and purified hydrogen from said first and second separation systems to said catalytic combustion system; and (g) means for recovering a high purity nitrogen gas stream from said catalytic combustion system, said high purity nitrogen having a desirably low residual oxygen content, whereby high purity nitrogen can advantageously be produced on-site by the convenient purification of low cost, impure hydrogen available on-site and the economical use thereof in the final purification of the partially purified nitrogen stream.

2. The system of claim 1 in which said first separation system comprises a membrane system.

3. The system of claim 1 in which said second separation system comprises a membrane system.

4. The system of claim 1 in which both the first and second separation systems comprise membrane systems.

5. The system of claim 1 in which said first separation system comprises a membrane system and said second separation system comprises a cryogenic system.

6. The system of claim 1 in which said first separation system comprises a pressure swing adsorption system and said second separation system comprises a cryogenic system.

7. The system of claim 1 in which said first separation system comprises a pressure swing adsorption system.

8. The system of claim 1 in which said second separation system comprises a pressure swing adsorption system.

9. The system of claim 1 in which said first and second separation systems comprise pressure swing adsorption systems.

10. A process for the on site production of high purity nitrogen gas from air comprising:

(a) passing feed air to a first membrane or pressure swing adsorption separation system for separation therein;

(b) withdrawing a partially purified nitrogen stream containing residual oxygen and an oxygen-rich discharge stream from said first separation system;

(c) passing impure hydrogen available on-site to a second membrane, pressure swing adsorption or cryogenic separation system for purification therein;

(d) reacting said purified hydrogen with residual oxygen present in said partially purified nitrogen stream in a catalytic combustion system;

(e) recovering a high purity nitrogen gas stream from said catalytic combustion system, said high purity nitrogen having a desirably low residual oxygen content, whereby high purity nitrogen can advantageously be produced on-site by the convenient purification of low cost, impure hydrogen available on-site and the economical use thereof in the final purification of the partially purified nitrogen.

11. The process of claim 10 in which said first separation system comprises a membrane system.

12. The process of claim 10 in which said second separation system comprises a membrane system.

13. The process of claim 10 in which said first and second separation systems comprise membrane systems.

14. The process of claim 10 in which said first separation system comprises a membrane system and said second separation system comprises a cryogenic system.

15. The process of claim 10 in which said first separation system comprises a pressure swing adsorption system and said second separation system comprises a cryogenic system.

16. The process of claim 10 in which said first separation system comprises a pressure swing adsorption system.

17. The process of claim 10 in which said second separation system comprises a pressure swing adsorption system.

18. The process of claim 10 in which said first and second separation systems comprise pressure swing adsorption systems.

19. The process of claim 10 in which the partially purified nitrogen stream has an oxygen content of about 1,000 ppm to about 50,000 ppm.

20. The process of claim 19 in which said oxygen content is from about 10,000 ppm to about 30,000 ppm.

21. The process of claim 10 in which said high purity nitrogen stream has a residual oxygen content of less than about 5,000 ppm.

22. The process of claim 21 in which said residual oxygen content is less than about 1,000 ppm.

* * * * *